US012171311B2

(12) United States Patent
Forsey et al.

(10) Patent No.: US 12,171,311 B2
(45) **Date of Patent: *Dec. 24, 2024**

(54) MECHANISM FOR MOVING AN OBJECT FOR A JEWELRY OR COSTUME JEWELRY ITEM

(71) Applicant: GREUBEL FORSEY S.A., La Chaux-de-Fonds (CH)

(72) Inventors: Stephen Forsey, Les Brenets (CH); Robert Greubel, Le Locle (CH); Anais Hamel, La Chaux-de-Fonds (CH)

(73) Assignee: GREUBEL FORSEY S.A., La Chaux-de-Fonds (CH)

( * ) Notice: Subject to any disclaimer, the term of this patent is extended or adjusted under 35 U.S.C. 154(b) by 143 days.

This patent is subject to a terminal disclaimer.

(21) Appl. No.: 17/637,525

(22) PCT Filed: Aug. 27, 2020

(86) PCT No.: PCT/EP2020/073952

§ 371 (c)(1),
(2) Date: Feb. 23, 2022

(87) PCT Pub. No.: WO2021/037967

PCT Pub. Date: Mar. 4, 2021

(65) Prior Publication Data

US 2022/0287422 A1 Sep. 15, 2022

(30) Foreign Application Priority Data

Aug. 29, 2019 (CH) ........................................ 1088/19
Aug. 29, 2019 (EP) ........................................ 19194233

(51) Int. Cl.
*A44C 17/02* (2006.01)
*G04B 47/04* (2006.01)

(52) U.S. Cl.
CPC ........ *A44C 17/0258* (2013.01); *G04B 47/044* (2013.01)

(58) Field of Classification Search
CPC ... A44C 17/0258; A44C 17/0275; A44C 5/00; A44C 7/00; A44C 9/00; A44C 9/0053;
(Continued)

(56) References Cited

U.S. PATENT DOCUMENTS 1,025,447 A * 5/1912 Blume .............. A44C 17/0258 63/31
3,305,946 A 2/1967 Du Gardin
(Continued)

FOREIGN PATENT DOCUMENTS

CH 332246 8/1958
CH 706245 10/2013
(Continued)

*Primary Examiner* — Jack W Lavinder
(74) *Attorney, Agent, or Firm* — DUANE MORRIS LLP; Gregory M. Lefkowitz

(57) ABSTRACT

Mechanism (1) for moving an object (11), which is suitable for being integrated into a wearable jewellery or costume jewellery item (3), comprising:—a manual drive source (5) which is capable of being driven directly or indirectly by an action of a user and which is arranged to drive a transmission (9) following an action of a user;—a support system (13) which carries an object (11) which is intended to be moved in rotation about a first rotation axis (A1) under the effect of the manual drive source (5) by means of the transmission (9), characterised in that the support system (13) comprises a first frame (**13*b*) which is mounted so as to pivot on a frame element about the first rotation axis (A1), and an internal frame (13*f*) which is mounted so as to pivot in the first frame (13*b*) about a second pivot axis (A2) which is substantially orthogonal to the first pivot axis (A1); and in that the object (11**) is arranged to be driven by an eccentric
(Continued)

drive element (15*b*) which is rigidly joined in rotation with a driving wheel (15) which is arranged to be driven by the transmission (9).

12 Claims, 6 Drawing Sheets

(58) Field of Classification Search
CPC .... A44C 9/0084; A44C 25/001; G04B 47/042
See application file for complete search history.

(56) References Cited

U.S. PATENT DOCUMENTS

| | | | | | |
|---|---|---|---|---|---|
| 3,365,877 | A * | 1/1968 | Altman | A44C 17/0275 224/241 |
| 5,119,350 | A * | 6/1992 | Delacretaz | A44C 17/0258 368/322 |
| 7,677,793 | B2 | 3/2010 | Lete et al. | |
| 8,995,233 | B2 | 3/2015 | Goeller et al. | |
| 9,268,309 | B2 | 2/2016 | Karsch | |
| 9,445,652 | B1 * | 9/2016 | Yousef | A44C 17/0258 |
| 10,775,745 | B2 * | 9/2020 | Gilomen | G04B 19/25366 |
| 11,036,185 | B2 | 6/2021 | Zaugg et al. | |
| 2014/0126338 | A1 | 5/2014 | Forsey et al. | |

FOREIGN PATENT DOCUMENTS

| | | |
|---|---|---|
| CH | 708190 | 12/2014 |
| CH | 708902 | 5/2015 |
| CH | 710217 | 4/2016 |
| CH | 712267 | 9/2017 |
| FR | 2988866 | 10/2013 |
| JP | S5975182 | 4/1984 |
| WO | 200605073 | 5/2006 |
| WO | 2018083586 | 5/2018 |

* cited by examiner

MECHANISM FOR MOVING AN OBJECT FOR A JEWELRY OR COSTUME JEWELRY ITEM

CROSS-REFERENCE TO RELATED APPLICATIONS

This application is a § 371 national stage entry of International Application No. PCT/EP2020/073952, filed Aug. 27, 2020, which claims priority to European Patent Application No. 19194233.3, filed Aug. 29, 2019, and Swiss Patent Application No. 01088/19, filed Aug. 29, 2019, the entire contents of which are incorporated herein by reference.

TECHNICAL FIELD

The present invention relates to the field of jewelry. It concerns more particularly a mechanism for animating an object, such as a jewel, a precious or semi-precious stone, a sculpture or any other miniature object, the mechanism being adapted for being integrated into a piece of jewelry.

PRIOR ART

Document CH708902 describes an animation mechanism comprising a turning support which can bear, among other possibilities, a jewel. An action on the part of a user makes it possible to rotate the support via an actuation member and a drive mechanism that is interposed between the latter and the jewel.

However, the rotation of the jewel is monotonous, since it is performed about a single axis, thereby limiting its visibility. The solution proposed in that document for viewing the jewel better is to provide an optical device comprising an assembly of concave mirrors mounted face-to-face, similar to that described in document JP 59-075 182. On the inside of this optical device is the jewel, secured to the latter. The jewel thus appears in a "floating" manner above a central opening in the upper mirror, which allows the jewel to appear.

In this construction, the jewel appears only virtually to the observer, as an optical illusion, and the observer can hardly observe it directly. In essence, the only visible part is its crown, which is visible at the bottom of the mirror assembly from a relatively narrow range of angles. Furthermore, this arrangement means that the scintillation of said jewel is not optimal.

The aim of the invention is consequently to propose a mechanism for animating an object, in which the above-mentioned defects are at least partially overcome.

DISCLOSURE OF THE INVENTION

More precisely, the invention concerns a mechanism for animating an object, such as a jewel, a precious or semi-precious stone, a sculpture or any other miniature object for a portable piece of jewelry. This mechanism is adapted for being integrated into such a piece of jewelry and comprises:

- a manual source of motive power arranged to drive a transmission following a direct or indirect action on the part of a user, it being possible for said transmission to comprise, for example, toothed members, one or more belts, chains or the like, or a combination of such elements;

- a support system bearing an object that is intended to be animated in rotation about a first axis of rotation under the effect of said manual source of motive power and via said transmission.

According to the invention, said support system comprises a first frame that is pivotably mounted on a chassis element about said first axis of rotation, and an inner frame that is pivotably mounted in said first frame about a second pivot axis, which is substantially orthogonal with respect to said first pivot axis.

Said object is arranged to be driven by an eccentric drive element, such as a lever or a crank, that rotates conjointly with a drive wheel that is arranged to be driven by said transmission.

In this way, a composite movement is imparted to the object directly or indirectly following an action on the part of the user, the movement being defined by back-and-forth rotations about each of the two axes of rotation, thereby conferring two degrees of rotational freedom on said object. The movement generated thus represents a rotary inclination, this increasing the visibility of the object, and improving scintillation in the event of the latter being a jewel or a precious or semi-precious stone.

Advantageously, said object is borne by a shaft that is pivotably mounted in said inner frame about a third axis of rotation, said shaft being arranged to rotate conjointly with a pinion that meshes with a fixed or rotary toothing that is coaxial with said drive wheel. This imparts a composite movement to the object, this movement being defined by the three pivot axes, and the object pivots not just in the rotary inclination mentioned above but likewise also about the third axis in a continuous movement.

Advantageously, said manual source of motive power comprises a prehension member that is arranged to be moved by an action on the part of a user. This prehension member may be for example a crown that is fixed to a stem, a turning bezel or caseback, a lever, a trigger piece or any other member that can be manipulated directly by the user.

As an alternative, said manual source of motive power may comprise an oscillating mass having an unbalance, which is actuated by pivoting or inclining the entire mechanism (in particular by pivoting the piece of jewelry in which it is integrated), this generating a movement of the oscillating mass and thus moving the object.

Advantageously, said transmission comprises a coupling that is arranged to be manually actuated in order to shift between a coupled state, in which said manual source of motive power is kinematically linked to said object, and a decoupled state, in which said manual source of motive power is decoupled from said object, which is thus free to move under the constraints of its support system. The coupling may be manually controlled, for example, via a pushbutton, a trigger piece system or by any other similar arrangement.

In another variant, in which the manual source of motive power comprises a prehension member and an oscillating mass, said transmission comprises a coupling that is arranged to be manually actuated in order to shift between a first state, in which said prehension member is kinematically linked to said object, and a second state, in which said oscillating mass is kinematically linked to said object. The driving of the object from the prehension member or from the oscillating mass can therefore be determined by the user. A third state, which is neutral, may also be provided.

Advantageously, the mechanism also comprises an energy accumulator kinematically situated in said transmission. This energy accumulator may advantageously be a spiral spring extending between an input wheel that is arranged to be driven by said manual source of motive power and an output wheel that is arranged to drive said object. In such a case, said transmission may comprise a brake system interposed kinematically between said output wheel and said object, said brake system being arranged to be manually actuated, for example via an ad hoc control member, such as a pushbutton. Thus, the energy accumulator can be wound manually, and then the object can be driven according to the wishes of the user. The energy accumulator could also be a helical spring or any other type of elastic element, but also any element that can store the energy in any way and return it.

Advantageously, at least a portion of said animated object extends out of the assembly of said frames, thus maximizing the visibility of said object. In other words, at least part of said animated object is situated further away from the drive wheel than the entirety of said frames.

This mechanism is, of course, intended to be integrated into a piece of jewelry comprising a mechanism as claimed in one of the preceding claims.

BRIEF DESCRIPTION OF THE DRAWINGS

Further details of the invention will appear more clearly upon reading the following description, which is provided in reference to the appended drawings, in which.

EMBODIMENTS OF THE INVENTION

Figure 1:
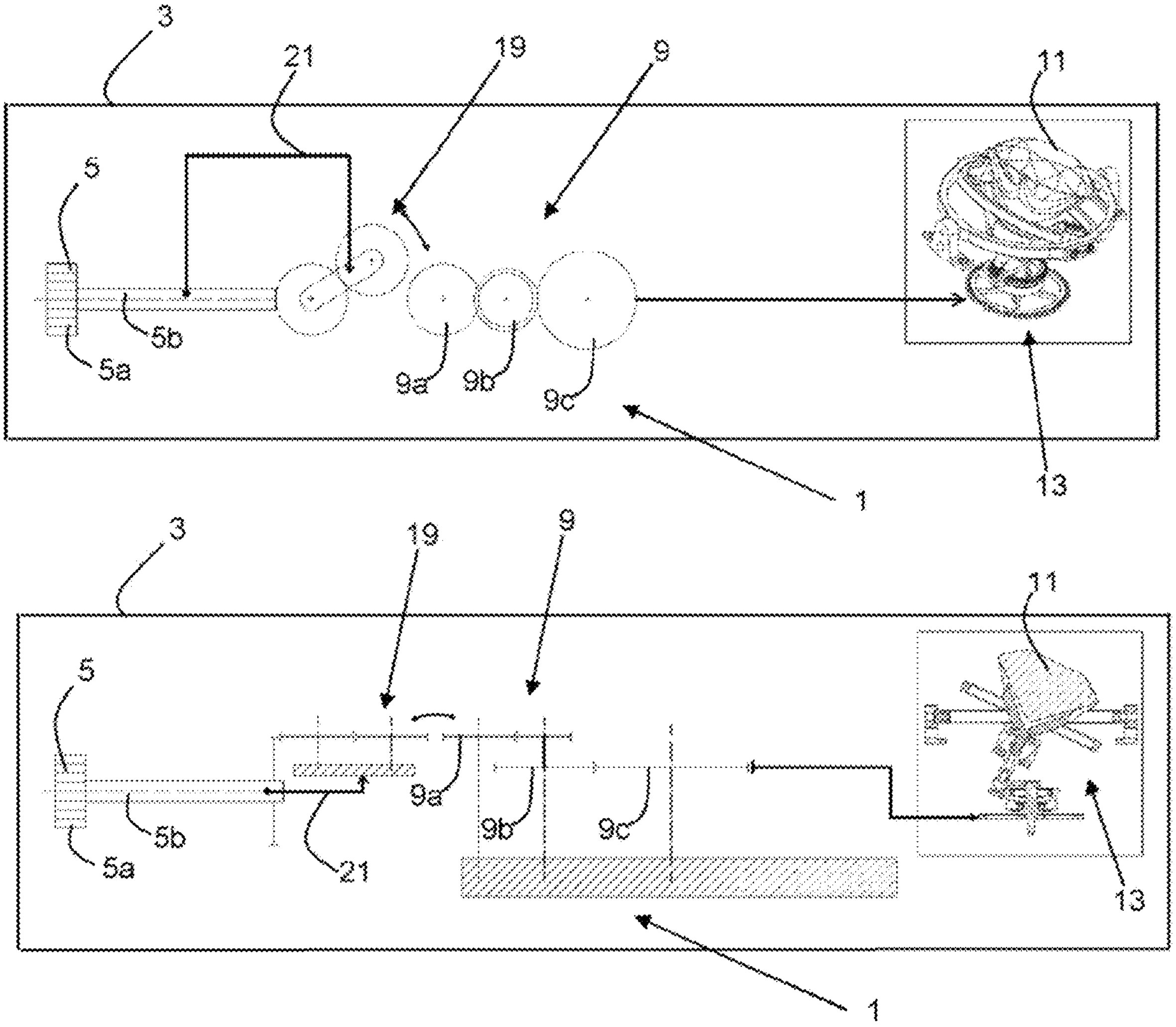
FIG. 1 is a schematic diagram of a first variant of a mechanism according to the invention, in plan and side views.

FIG. 1 illustrates a plan view and a side view of a first embodiment of a mechanism 1 for animating an object 11, such as a jewel, a precious or semi-precious stone, a sculpture or any other miniature object, said mechanism being able to be integrated into a piece of jewelry 3. The latter may be, for example, a piece of jewelry intended to be worn as a bracelet, necklace or brooch, or for being placed on a surface, such as a table. In these figures, some of the kinematic and/or functional links are shown simply by arrows; a person skilled in the art well knows how to arrange the geartrains, the belts, the chains or the like in order to create the links indicated. Furthermore, multiple toothed members have been shown by their pitch circles.

The mechanism 1 comprises a manual source 5 of motive power, arranged to be driven directly by an action on the part of a user on a prehension member 5*a*. In the variant illustrated, the prehension member 5*a* of the manual source 5 of motive power is a crown 5*a*, which rotates conjointly with a stem 5*b*, but other possibilities can be envisaged, such as a rotating bezel, a trigger piece, a turning caseback or any other movable member that can be driven in rotation and/or in translation by a user. If the piece of jewelry is a wristwatch or pocket watch, the crown 5*a* may also be that which performs the winding and/or the time-setting of the piece.

The manual source 5 of motive power is kinematically linked to an object 11 to be animated via a transmission 9 which comprises a plurality of toothed members 9*a*, 9*b*, 9*c*, each of which is made up of one or more toothed wheels and/or pinions, which mesh with one another and are driven by the stem 5*b* via a coupling 19 of any form, the coupling 19 forming part of said transmission. A horizontal coupling is illustrated, but vertical couplings, inclining-pinion couplings or differential couplings are also possible, all of these couplings being known in particular in chronograph mechanisms, which therefore do not have to be described in detail here. A sliding-pinion arrangement as is known in watch hand-setting and/or winding systems is also possible.

In any case, the state of the coupling 19 is controlled as a function of the axial position of the stem 5*b* via a conventional pull-out piece system or by any other similar arrangement controlled by the stem 5*b* or by another control member, such as a lever, a pushbutton or the like.

Instead of a geartrain, the transmission 9 may comprise one or more belts, chains or the like, or a combination of a geartrain and one or more of these elements.

When the coupling 19 is in the coupled state, a pivoting of the crown 5*a* will move the object 11; by contrast, when the coupling is in the decoupled state, the object 11 is free to move under the effect of gravity, in accordance with the freedom conferred by the support system 13 which supports it. As far as the latter is concerned, this point will be revisited below in detail. Furthermore, it is noted that the kinematic links may have relatively significant play and/or comprise elastic elements, such as elastic belts or the like, in order to allow the animated object to “float” to a certain extent under the effect of movements of the piece 3.

Figure 2:
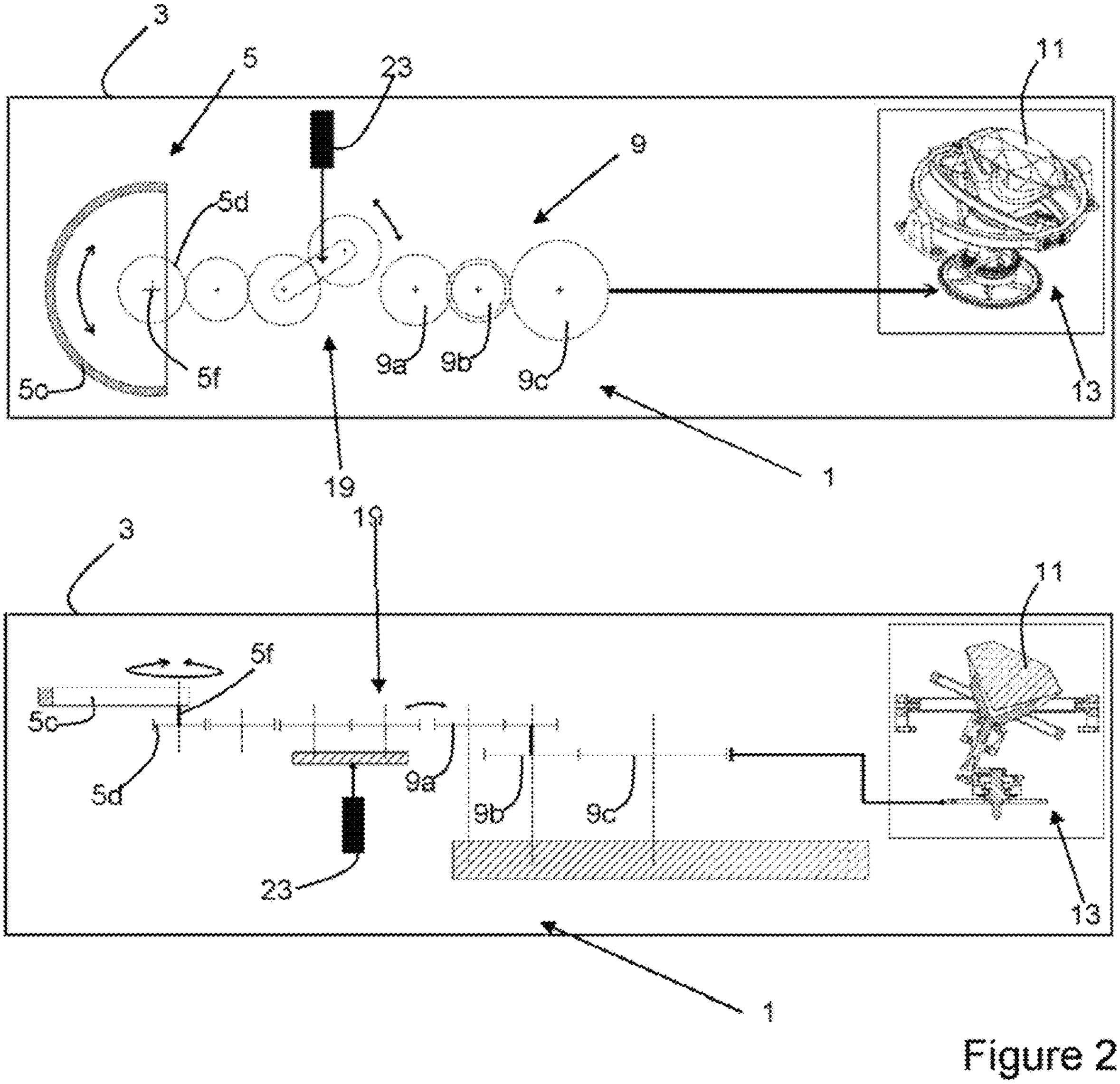
FIG. 2 is a schematic diagram of a second variant of a mechanism according to the invention, in plan and side views.

The embodiment of FIG. 2 differs from that of FIG. 1 in that the manual source 5 of motive power is an oscillating mass 5*c* having an unbalance, wherein the mass 5*c* rotates conjointly with a toothed member 5*d* that is arranged coaxially with the axis of rotation 5*f* of the mass 5*c*. If the piece is pivoted manually by the user, the mass 5*c* will pivot, which will drive the movements of the animated object 11 as long as the coupling 19 is in the coupled state. If the coupling 19 is in the decoupled state, the animated object is free to move as mentioned above.

In this variant, the state of the coupling is controlled via a manual control member 23, such as a pushbutton or any other appropriate control member.

Figure 3:
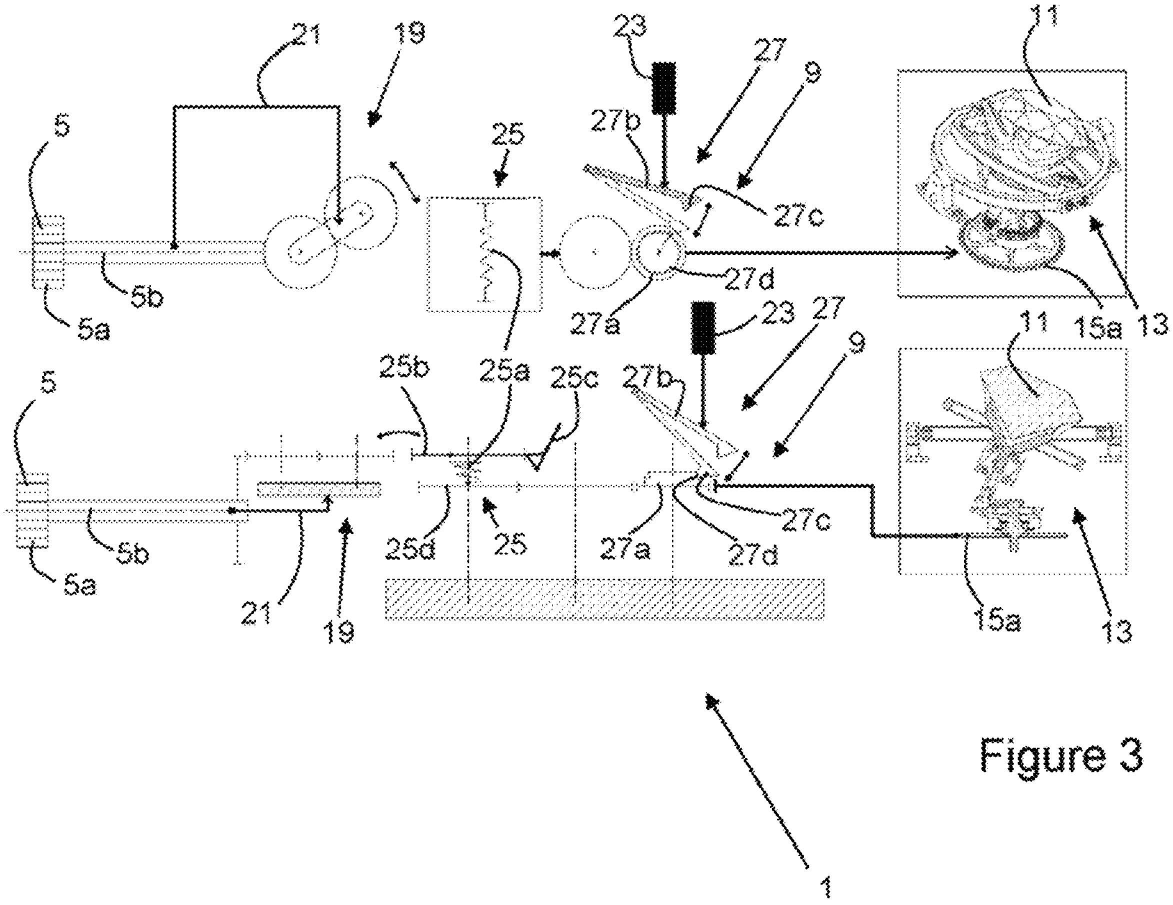
FIG. 3 is a schematic diagram of a third variant of a mechanism according to the invention, in plan and side views.

The embodiment of FIG. 3 differs from that of FIG. 2 in that an energy accumulator 25 is interposed in the transmission 9 between the manual source 5 of motive power and the animated object 11, in particular kinematically downstream of the coupling 19. The energy accumulator 25 comprises a spiral spring 25*a*, a first end of which is attached to an input wheel 25*b* that is arranged to be driven by the stem 5*b* via the coupling 19, and a second end of which is attached to an output wheel 25*d*. In order that the input wheel 25*b* cannot pivot in the wrong direction, the consequence of which would be the detrimental effect of the spring 25*a* being unwound by the input 25$b$, a unidirectional pawl 25$c$ is provided so that the input wheel 25$b$ can pivot only in the direction of the winding of the spring 25$a$. Other forms of accumulators can also be envisaged, such as a helical spring or any other type of elastic element, but also any element that can store energy in any way and return it.

The mechanism also comprises a brake system 27, of which a braking wheel 27$a$ is located in the transmission 9 and cooperates with a brake 27$b$. The braking wheel 27$a$ is thus interposed kinematically between said output wheel 25$d$ and the animated object 11. The state of the brake system 27 is controlled by a handling member 23, which controls the position of the brake 27$b$ such that it can shift between a braked state, in which the part of the transmission 9 downstream of the spring 25$a$ is blocked and the animated object is blocked, and a non-braked state in which the animated object 11 is driven by the spring 25$a$.

In the embodiment illustrated, the brake 27 comprises a pivoting lever which comprises a beak 27$c$ at its free end, the beak 27$c$ being able to cooperate with a toothing 27$d$ comprised by the braking wheel 27$a$. In the non-braked state (solid lines), the beak 27$c$ is situated away from the toothing 27$d$, whereas, in the braked state (dashed lines), the beak 27$c$ penetrates into said toothing 27$d$ in order to prevent any rotation of the braking wheel 27$d$.

In this way, the user can wind the spring 25$a$ and then trigger the animation of the animated object 11 as desired.

In a variant, not illustrated, which is based on that of FIG. 3, the stem 5$b$ and the crown 5$a$ may be replaced by an oscillating mass 5$c$, as in the embodiment of FIG. 2.

Even though each of the embodiments described up to now comprises a coupling 19 in the kinematic chain extending between the manual source 5 of motive power and the object 11, it is possible for this coupling not to be present. It is furthermore noted that the mechanism 1 according to the invention is devoid of any regulating system that serves to moderate the rotational speed of the object 11.

Figure 4A:
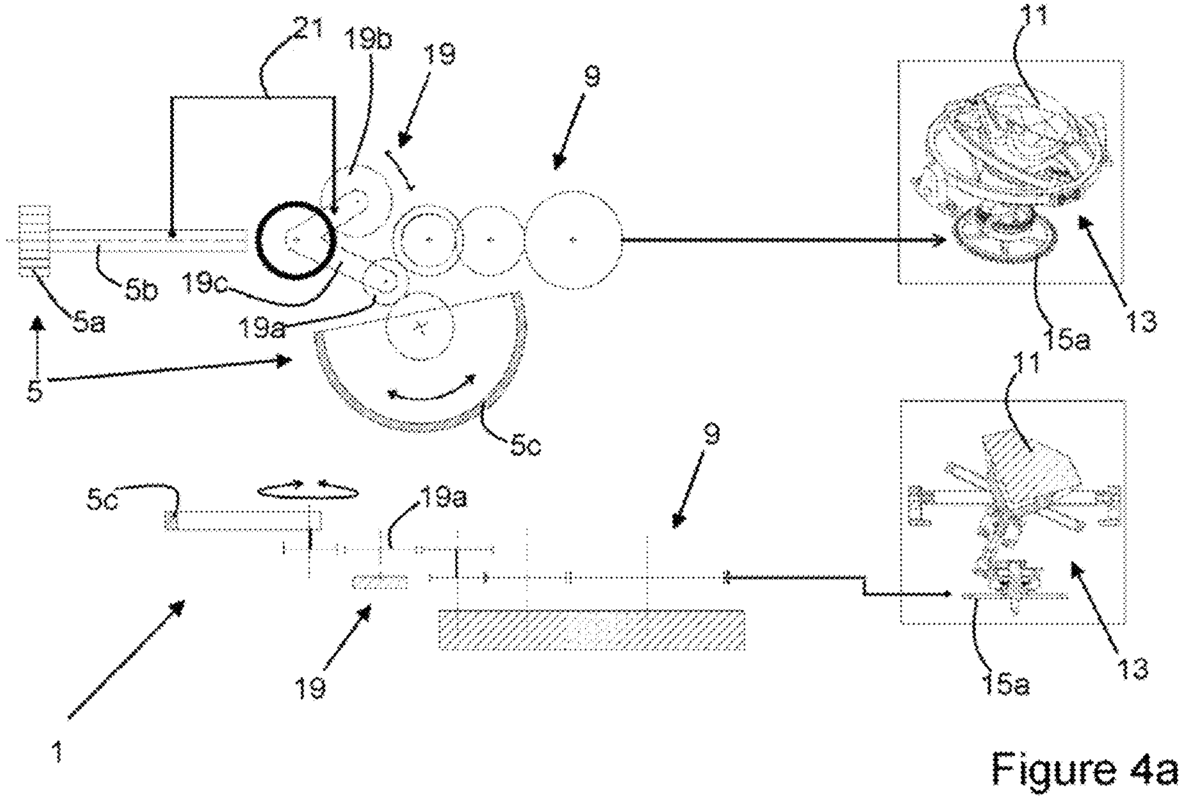
FIG. 4*a* is a schematic diagram of a fourth variant of a mechanism according to the invention, in a plan view in its entirety and in a partial side view in a state in which an oscillating mass is kinematically linked to the animated object.
Figure 4B:
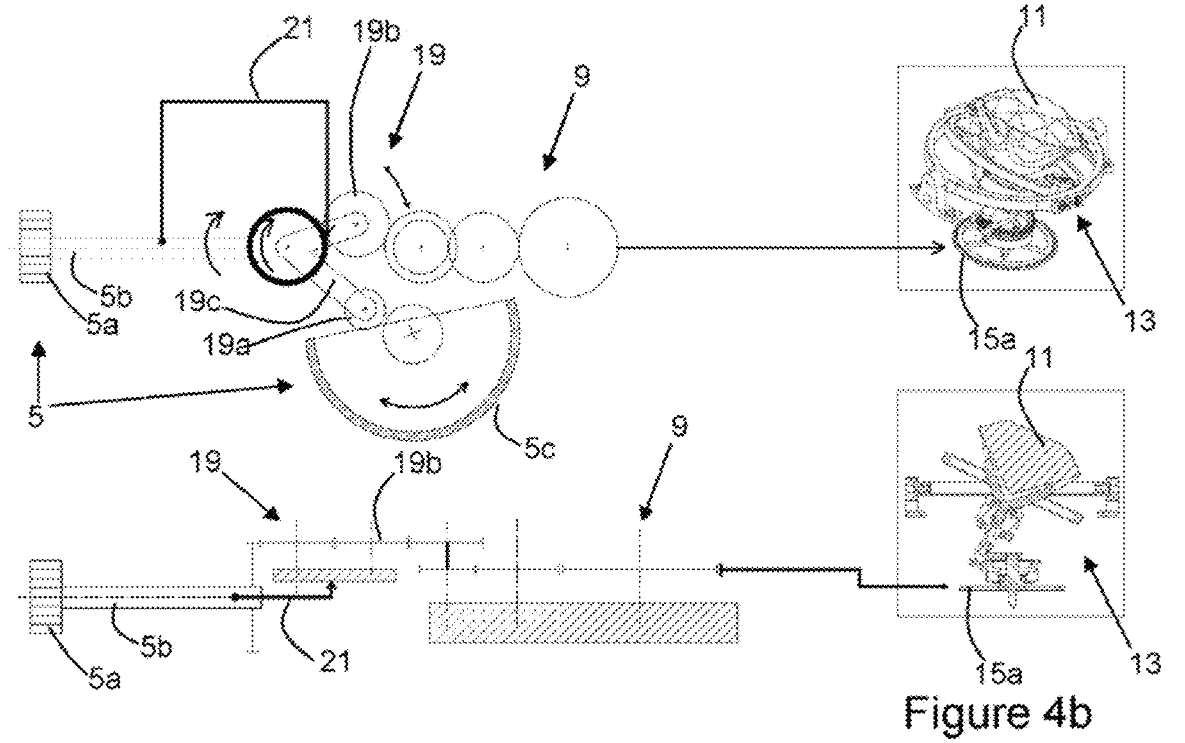
FIG. 4*b* is a schematic diagram of a fourth variant of a mechanism according to the invention, in a plan view in its entirety and in a partial side view in a state in which a stem is kinematically linked to the animated object.

FIGS. 4$a$ and 4$b$ illustrate another embodiment of the invention, which combines the features of FIGS. 1 and 2. In these figures, not all of the reference signs have been reproduced, in order not to overload the figures unnecessarily.

In this variant, the coupling 19 is arranged to establish a kinematic link between, on the one hand, either the stem 5$b$ or the oscillating mass 5$c$ and, on the other hand, the animated object 11. To this end, the coupling comprises a first sliding pinion 19$a$, arranged to establish a kinematic link between the oscillating mass 5$c$ and the rest of the geartrain 9 (as FIG. 4$a$ illustrates), as well as a second sliding pinion 19$b$ arranged to establish a kinematic link between the stem 5$b$ and the rest of the geartrain 9 (as FIG. 4$b$ illustrates). These two pinions 19$a$, 19$b$ are borne by a lever 19$c$, the position of which is controlled by a pull-out piece 21 or another control member.

Consequently, depending on the state of the lever 19$c$, the object set in motion 11 may be movably driven either by the oscillating mass 5$c$ (FIG. 4$a$) or by the stem 5$b$ (FIG. 4$b$). It is also noted that the coupling 19 may also be arranged so as to be able to occupy a third position, uncoupled, in which there is no manual source 5 of motive power kinematically linked to the animated object 11.

In a variant which is not illustrated, an energy accumulator may also be incorporated in the transmission 9, in a manner analogous to FIG. 3.

Figure 5:
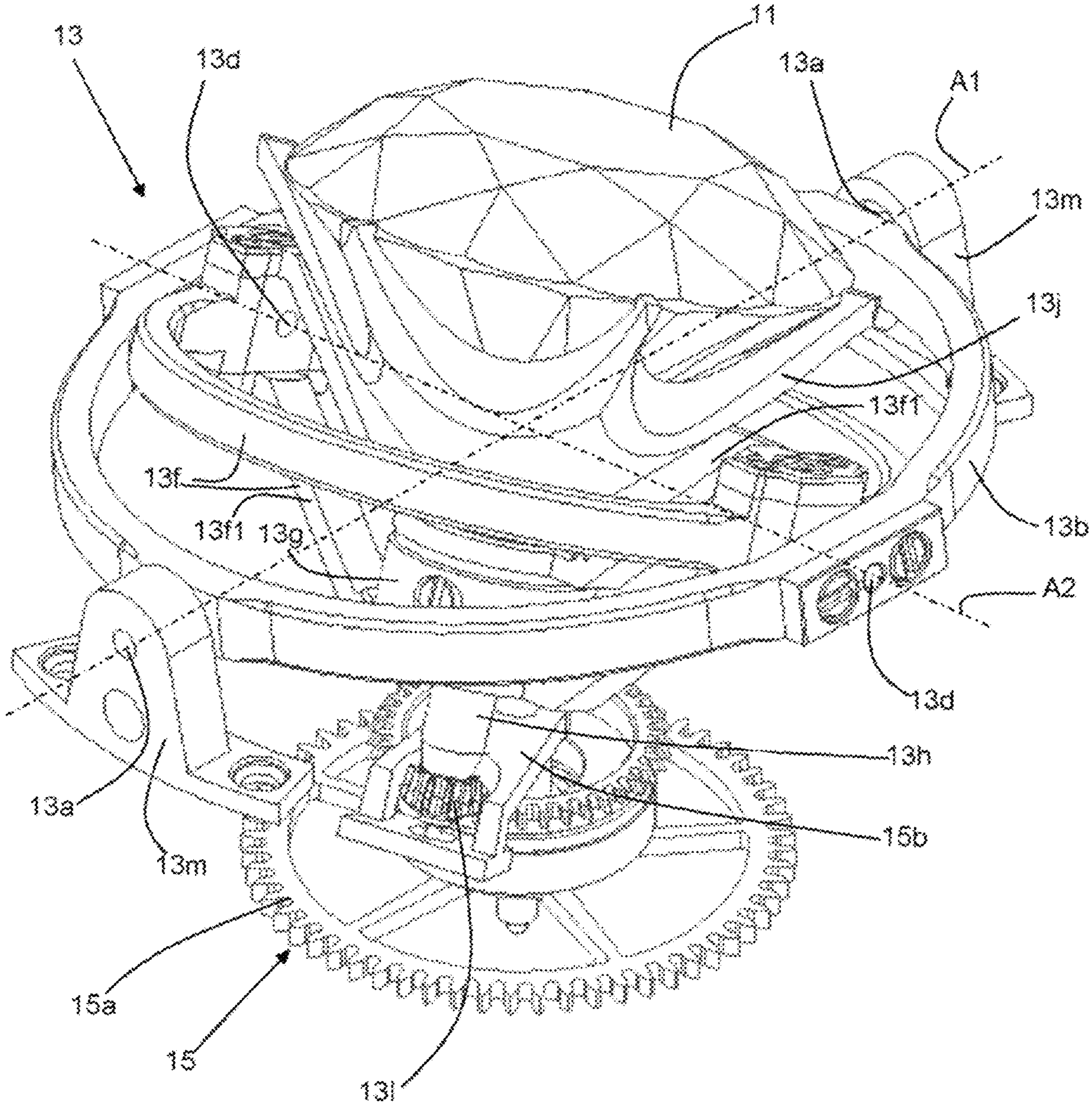
FIG. 5 is an isometric view of the assembly comprising the animated object, the support system, the drive wheel and the fixed toothing.
Figure 6:
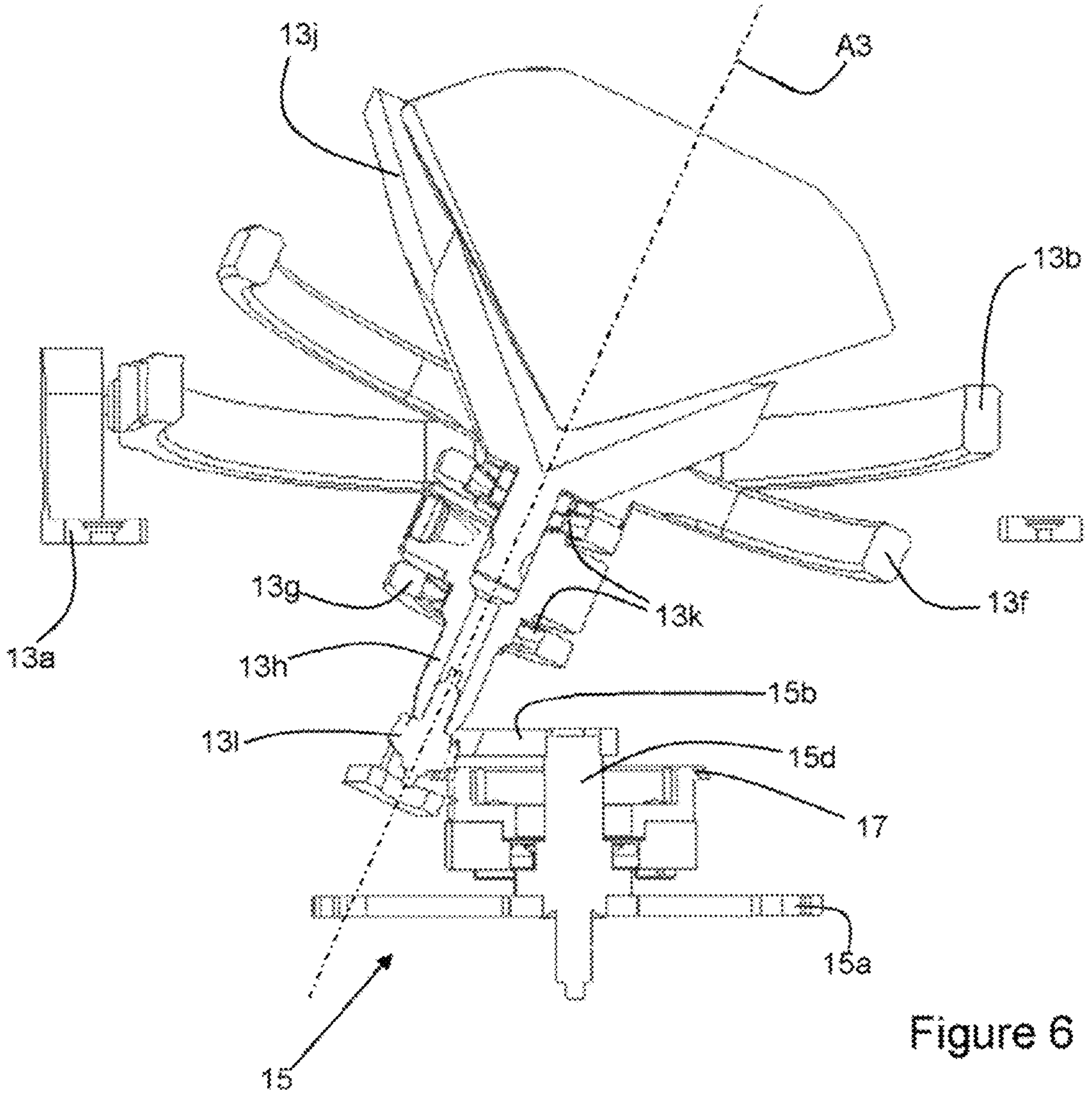
FIG. 6 is a sectional isometric view of the assembly illustrated in FIG. 5.

As FIGS. 5 and 6 illustrate more clearly, the animated object 11 is supported by a very particular support system 13, which connects it to a chassis element (not shown) via a pair of pivots 13$a$ borne by supports 13$m$ fixed to the latter.

These pivots 13$a$ define a first pivot axis A1, about which is pivoted a first frame 13$b$ composed of an annular ring of generally circular shape. Other shapes (oval, square, rectangular, etc.) are also possible. This frame 13$b$ bears a pair of intermediate pivots 13$d$, which define a second axis of rotation A2 that is substantially orthogonal with respect to said first axis A1. An inner frame 13$f$ is pivotably mounted about this second axis A2 inside the first frame 13$b$ and is secured to a base 13$g$ which directly or indirectly bears the animated object 11. The inner frame 13$f$ is composed of a part having a substantially circular shape, as well as two arms 13$f$1 which connect the pivots 13$d$ to the base 13$g$. It goes without saying that other shapes are also possible and it is even not obligatory for the frame 13$f$ to comprise the annular part. Indeed, the base 13$g$ may simply be connected to the pivots by the arms 13$f$1 or by another ad hoc arrangement.

At least one of the frames 13$b$, 13$f$ may be equipped with any type of decoration, for example an enameling, precious or semi-precious stones or any other desired decoration. Furthermore, at least one of the shafts of the pivots 13$d$, 13$a$ may project beyond the surface of the element through which it passes, that is to say the outer surface of the first frame 13$b$ for the pivots 13$d$ or the outer surface of the support 13$m$ in the case of the pivots 13$a$, and may bear a decoration, such as for example a precious or semi-precious stone. The movement of this stone will thus generate scintillations which will enhance the perception of the pivoting of the frame with which the stone conjointly rotates.

It should also be noted that none of the frames 13$b$, 13$f$ is superposed over the animated object 11, which extends from the latter 13$b$, 13$f$ and thus protrudes, thus maximizing its visibility. In other words, at least part of said object 11 is further away from the drive wheel 15 than the entirety of the frames 13$b$, 13$f$.

In the embodiment illustrated, the animated object 11 is supported by a shaft 13$h$, which passes through the base 13$g$ and is secured to a support 13$j$ in which the animated object 11 is fixed by setting. As an alternative, the object 11 may be fixed there by gluing, screwing, soldering, driving or the like, depending on the nature of the object 11 and the support 13$j$, and it is noted that the animated object 11 may be coaxial with the shaft 13$h$ or may be decentered with respect to this latter.

Furthermore, the link between the animated object 11 and the inner frame 13$f$ may comprise a flexible element, for example made of elastomer, to allow the object to gently "float" under the effect of the movement of the piece.

The shaft 13$h$ is mounted in bearings 13$k$ provided in the base 13$g$ such that said shaft 13$h$ may pivot with respect to this latter.

In view of the foregoing, it is clear that the support system defines a gimbal support, which confers two degrees of rotational freedom on the animated object 11 and, substantially, no degree of translational freedom. The pivoting of the shaft 13$h$ in the base 13$g$ confers a third degree of rotational freedom on the object set in motion 11 about a third axis A3, which corresponds to the geometric axis of the shaft 13$h$. However, this third degree of freedom is not obligatory, as explained below, in which case the support 13$j$ may be integrated in the inner frame, or vice versa.

The driving of the animated object 11 about the third axis A3 is assured by the cooperation between a pinion 131 constituted by a toothing comprised by the shaft 13$h$ and a conical toothing 17 that is coaxial with the drive wheel 15 and is fixed in the construction illustrated. Other forms of toothing are also possible, such as an internal conical toothing borne by a crown or other ad hoc gears.

In order to impart motion to the object 11, the mechanism furthermore comprises a drive wheel 15, which comprises a toothed wheel 15*a* arranged to be driven by an element of, or linked kinematically to, the transmission 9 and thus serving as a power take-off. Of course, the interposition of additional toothed wheels and/or other forms of kinematic linkage, such as belts or chains, are also possible. The axis of rotation of the drive wheel 15 is arranged so as to substantially cross the intersection of the axes A1 and A2, but in certain configurations a certain offset is also permitted, thereby making it possible to render the movement of the object 11 non-symmetrical.

The drive wheel 15 also comprises an eccentric drive element 15*b*, which rotates conjointly with said toothed wheel 15*a* and is linked thereto by a shaft 15*d*. The eccentric drive element 15*b* as illustrated takes the form of a bent lever or crank that is fixed to the shaft 15*d*, the free end of the eccentric element 15*b* cooperating with the end of the stem 13*h* in order to drive it along a substantially circular course. Thus, when the drive wheel turns, the object 11 performs a composite movement having two degrees of rotational freedom, the amplitude of which is defined by the geometry of the support system 13 and the radius of the eccentric drive element 15*b*. This movement is back-and-forth about each of the axes A1 and A2, thereby creating an inclined orbital movement.

At the same time, the toothing 131 of the shaft 13*h* rolls on the fixed toothing 17, this causing the animated object 11 to pivot about the third axis A3.

In this way, the animated object 11 pivots about the three axes A1, A2, A3, and its movements make it more visible to the observer than in the case of the prior art. Consequently, the observer no longer has to observe it from acute angles in order to directly see more than its front face.

It goes without saying that other constructions for the drive eccentric 15*b* are possible and that the gear ratios may be adapted to the needs of the constructor for the purpose of animating the object 11 at a desired rotational speed about the three axes of rotation.

As mentioned above, rotation of the object 11 about the third axis A3 is not obligatory. In such a case, it is possible that the fixed toothing 17 and the pinion 131 of the shaft 13*h* are not provided, the movement of the animated object 11 thus being defined exclusively by back-and-forth rotations about the two axes A1 and A2. In such a case, the object 11 may be arranged to be rotationally-integrated with the shaft 13*h* and/or the base 13*g*.

In order to allow the object 11 to be illuminated from below (that is to say, from the direction of the drive wheel 15), the support system 13 may be located inside, or superposed on, a polished well (not illustrated), which may take for example the form of a cup, a parabolic, elliptical or hemispherical mirror or the like, which is arranged to direct the ambient light onto the lower face of the object. As a further alternative, a light source (for example a tritium element, one or more LEDs or the like) may be positioned underneath the object and the frames 13*b*, 13*f*. In this way, if the object 11 is a stone, its scintillations may be improved.

It is possible for the mechanism 1 described above not just to represent the only mechanism in a piece of jewelry 3, but to be able for example to be combined with a mechanical or electrical watch movement, in the event that the piece of jewelry 3 is a timepiece such as a wristwatch, pocket watch or the like.

Although the invention has been described above in connection with specific embodiments, other additional variants can also be envisaged without departing from the scope of the invention as defined by the claims.

The invention claimed is:

1. A mechanism for animating an object, adapted for being integrated into a portable piece of jewelry, comprising:

a manual source of motive power that can be driven directly or indirectly by an action of a user and arranged to drive a transmission following an action of a user;

a support system bearing an object that is intended to be animated in rotation about a first pivot axis of rotation due to said manual source of motive power via said transmission, wherein said support system comprises an assembly of frames comprising a first frame that is pivotably mounted on a chassis element about said first pivot axis of rotation, and an inner frame that is pivotably mounted in said first frame about a second pivot axis which is substantially orthogonal with respect to said first pivot axis; and in that said object is arranged to be driven by an eccentric drive element that rotates conjointly with a drive wheel arranged to be driven by said transmission.

2. The mechanism as claimed in claim 1, wherein said object is borne by a shaft that is pivotably mounted in said inner frame about a third pivot axis of rotation, said shaft being arranged to rotate conjointly with a pinion that meshes with a toothing that is coaxial with said drive wheel, said toothing being fixed or arranged so that rotation can be imparted thereto.

3. The mechanism as claimed in claim 1, wherein said eccentric drive element is a crank or a lever.

4. The mechanism as claimed in claim 1, wherein said manual source of motive power comprises a prehension member that is arranged to be moved by an action of a user.

5. The mechanism as claimed in claim 4, wherein said transmission comprises a coupling that is arranged to be actuated manually in order to shift between a coupled state, in which said manual source of motive power is kinematically linked to said object, and a decoupled state, in which said manual source of motive power is decoupled from said object.

6. The mechanism as claimed in claim 4, wherein said manual source of motive power comprises an oscillating mass, and wherein said transmission comprises a coupling that is arranged to be actuated manually in order to shift between a first state, in which said prehension member is kinematically linked to said object, and a second state, in which said oscillating mass is kinematically linked to said object.

7. The mechanism as claimed in claim 1, wherein said manual source of motive power comprises an oscillating mass.

8. The mechanism as claimed in claim 1, furthermore comprising an energy accumulator located in said transmission.

9. The mechanism as claimed in claim 8, wherein said energy accumulator is a spiral spring extending between an input wheel that is arranged to be driven by said manual source of motive power and an output wheel that is arranged to drive said object.

10. The mechanism as claimed in claim 9, wherein said transmission comprises a brake system interposed kinematically between said output wheel and said object, said brake system being arranged to be actuated manually.

11. The mechanism as claimed in claim 1, wherein at least a portion of said object extends out of the assembly of frames.

12. A piece of jewelry comprising a mechanism as claimed in claim 1.

* * * * *